Feb. 21, 1928. 1,659,797
C. W. WILSON
FAUCET
Filed Feb. 17, 1926 2 Sheets-Sheet 1
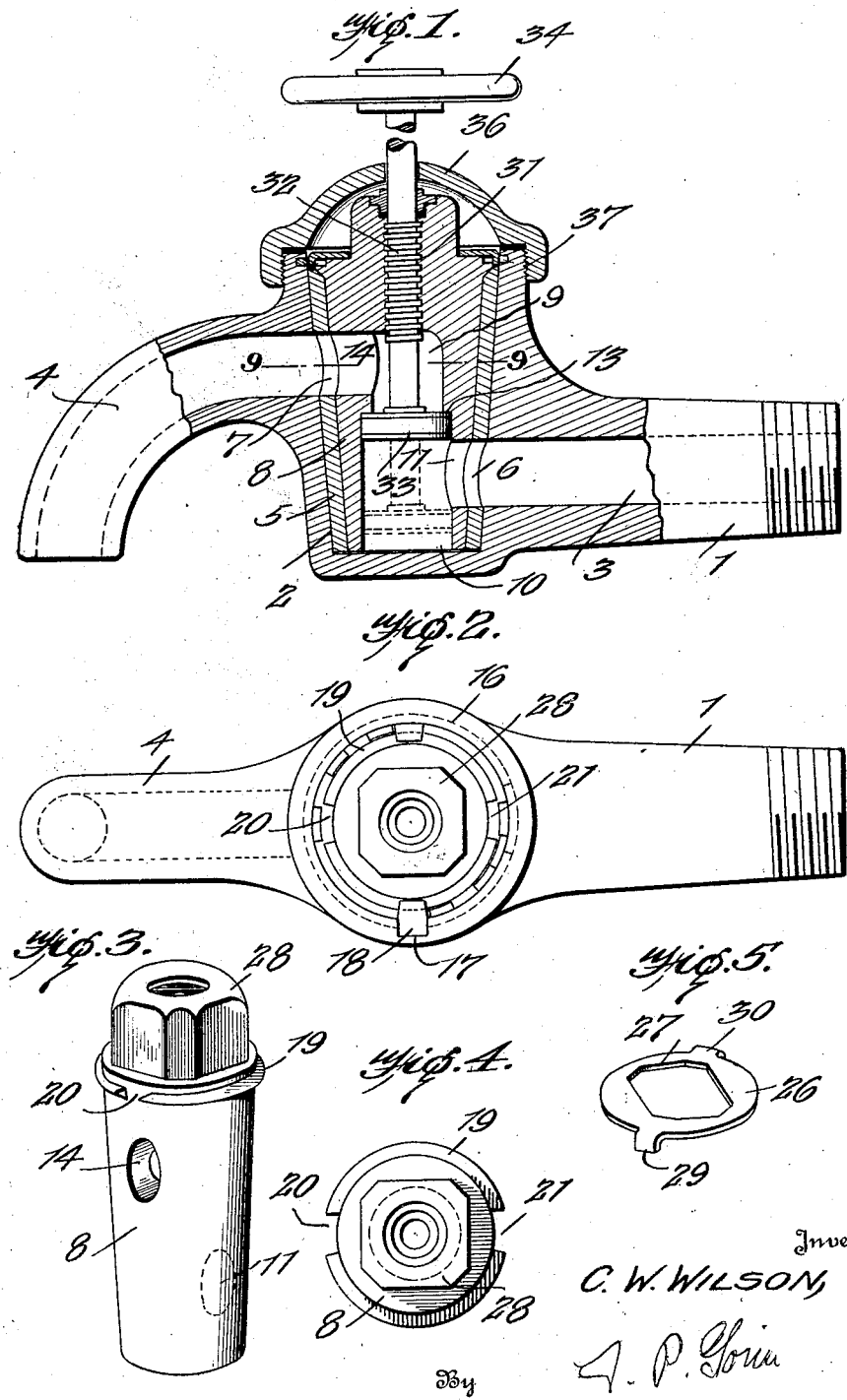

Feb. 21, 1928. 1,659,797
C. W. WILSON
FAUCET
Filed Feb. 17, 1926 2 Sheets-Sheet 2
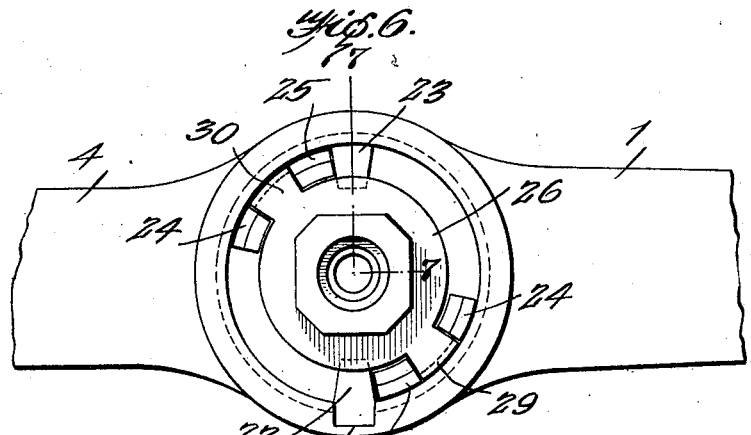
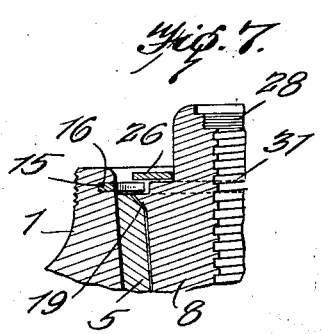
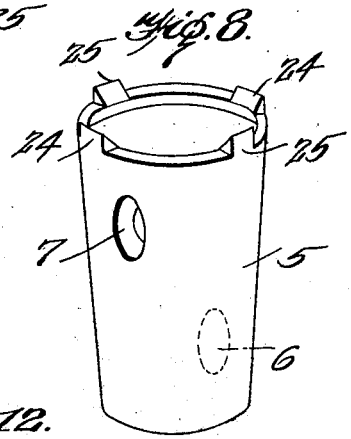
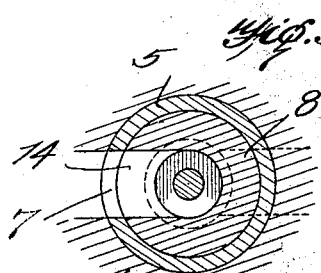
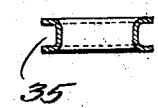
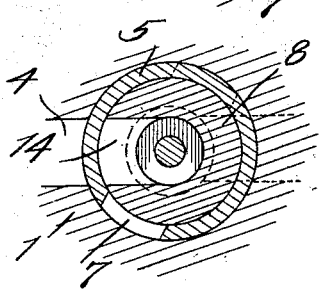
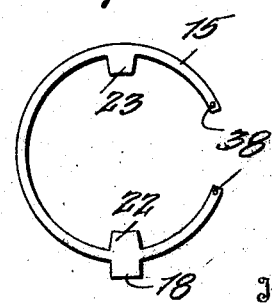
Inventor
C. W. WILSON,
By
F. P. Goin
Attorney Patented Feb. 21, 1928.

1,659,797

UNITED STATES PATENT OFFICE.

CHARLES W. WILSON, OF RENTON, WASHINGTON.

FAUCET.

Application filed February 17, 1926. Serial No. 88,891.

This invention relates to an improvement in faucets, wherein the flow of water is normally controlled by a hand operated valve in the usual manner, with the parts so constructed and arranged that the flow through the faucet may be cut off at will independently of the valve to thereby permit the separation of the valve carrying element for repair or replacement of the valve parts without the necessity of cutting off the water from the system. The invention includes a valve plug formed with a channel therethrough for the passage of water, this plug carrying a hand operated valve to control the flow of water through such channel. Intermediate the plug and the faucet casing, there is provided a cut off valve, which is formed with openings to establish communication between the valve plug channel and the bore of the faucet, means being provided whereby the cut off sleeve may be operated to move the openings into or out of communication with the valve plug channel and the faucet bore, whereby the flow of water may be permitted or interrupted in accordance with the position of the cut off valve to permit removal of the valve plug for access to the valve without the necessity of cutting off the supply to the system as a whole.

The invention is illustrated in the accompanying drawings, in which:

Fig. 1 is a sectional view, partly in elevation, of the faucet with the improved fluid control parts arranged therein.

Fig. 2 is a plan of the same with the cap removed.

Fig. 3 is a perspective of the valve plug.

Fig. 4 is a plan of the same.

Fig. 5 is a perspective of the operating disc.

Fig. 6 is an enlarged plan view similar to Fig. 2, with the parts operated to cut off the flow of liquid.

Fig. 7 is a section on line 7—7 of Fig. 6.

Fig. 8 is a perspective view of the cut off sleeve.

Fig. 9 is a section on line 9—9 of Fig. 1, the cut off sleeve being in open position.

Fig. 10 is a similar view with the cut off sleeve in closed position.

Fig. 11 is a perspective view of the retaining ring.

Fig. 12 is a vertical sectional view through the valve proper.

The improved faucet 1 is centrally formed with a conical chamber 2, open at the top and closed at the bottom and extending vertically of the faucet. The chamber 2 is open to the supply through a channel or bore 3 opening through the connected end of the faucet, and to the delivery through a channel or bore 4 formed in the usual spout.

Mounted for an accurate turning fit in the conical chamber 2 of the faucet is what may be termed a cut off sleeve 5 having openings 6 and 7 which in the open position of the sleeve communicate respectively with the bores 3 and 4. Within the cut off sleeve 5 is rotatably mounted a valve plug 8 arranged to accurately fit within the sleeve to prevent leakage between the members. The valve plug is formed with a channel 9 having an enlarged portion 10 opening through the bottom of the plug and formed with a lateral opening 11 to register with the bore 3 of the faucet body. The upper end of the enlarged portion 10 of the channel is formed as a valve seat 13, and the channel 9 above the valve seat has a lateral communicating bore 14 which registers with the bore 4 of the faucet body.

It will be apparent from the above that the sleeve 5 is rotatable in the body and relative to said body and valve plug, and that when the sleeve is in one position, an uninterrupted water passage is permitted through the faucet disregarding the valve, while such water passage is interrupted on the rotation of the valve sleeve to arrange the openings 6 and 7 out of registry with the respective bores in the faucet.

Means are provided whereby the valve sleeve is held against other than a rotative movement in the faucet body and the valve plug fixed with relation to the sleeve except through relative longitudinal movement in a predetermined position. This means includes a split spring holding ring 15, shown more particularly in Fig. 11, adapted to seat in a groove 16 formed near the upper edge of the wall of the chamber 2, the groove having an offset recess 17 in which a lip 18, projecting outwardly from the ring, is adapted to engage to hold the ring in fixed position in the faucet body. The plug 8 is formed near the upper edge with an annular rib 19 interrupted at diametrically opposite points, as at 20 and 21, to form recesses to permit the passage therethrough of lips 22 and 23 extending inwardly of the holding ring. These lips are in a position to overlie the annular rib 19 and thereby, except when the plug 8 is in such position that its openings 20 and 21 are in line with the lips 22 and 23, the plug is held against relative vertical movement in the sleeve.

The valve sleeve 5 which is held against vertical movement in the body by the ring 15, as shown in Fig. 7, is formed on its upper edge with spaced lugs 24 and 25 arranged in diametrically opposed pairs, and an operating disk 26 is formed with diametrically opposed fingers 29 and 30 which are placed between and more or less accurately fit the space between the respective lugs 24 and 25. The disk ring has a non-circular central opening 27 which fits over a correspondingly formed projection 28 on the valve plug.

The valve plug has a threaded bore 31 to receive a correspondingly threaded valve stem 32, the lower end of which is provided with a valve 33 for cooperation with the seat 13, the upper end of the stem extending beyond the projection 28 on the valve plug and being provided with a handle 34. The valve 33 is of peculiar form in that the circular member constituting said valve has its upper and lower edges deflected to form an annular channel 35 in which is arranged a suitable packing, such as asbestos or the like, to bear against the wall of the enlarged portion 10 of the channel 9 and maintain a fluid-tight fit. A cap 36 through which the stem 32 passes is threaded at 37 upon the upper portion of the faucet body.

From the above description it will be apparent that as the projections 22 and 23 of the ring 15 bear upon the shoulder 19 of the valve plug 8, said valve plug is permitted a rotary movement but held against endwise movement. Any rotary movement of the valve plug, however, is communicated to the sleeve 5 as the projections 29 and 30, which are in effect fixed with relation to the valve plug 8, fit between the lugs 24 and 25 of the sleeve 5. The valve plug, carrying with it the sleeve, may be rotated then until one of the lugs on the sleeve, as 25, comes in contact with the lips 22 and 23 on the ring. In this position the openings 6 and 7 in the sleeve 5 and the bore 14 of the plug 8 are in position to permit flow of water through the faucet, as such is controlled by the valve 33. At this time it will be understood that the recesses 20 and 21 in the plug 8 are out of alignment with the lips 22 and 23 of the ring. When it is desired to remove the valve plug for adjustment or correction of the valve, the cap 36 is removed and the valve plug turned, in the only possible direction as will be plain from Fig. 6, until the lugs 24 of the sleeve 5 engage the lips 22 and 23 of the locking ring. In this position, the plug 8 and sleeve 5 have been turned together and hence the openings 6 and 7 of the sleeve are out of alignment with the bores 3 and 4 of the faucet body and the flow of water is cut off. When the parts have been turned to this position, the recesses 20 and 21 in the rib 19 are in alignment with the lips 22 and 23 of the ring 15. Therefore, as the lips will pass through the recesses, the plug may be bodily removed from the sleeve, and after replacement the plug and sleeve are returned to the operative position indicated in Fig. 6 where the parts are held against other than rotary movement.

The locking ring 15 is preferably formed with small openings 38 at its ends, whereby through the use of a suitable implement the ring may be contracted and withdrawn as desired.

Claims:

1. A faucet body having a conical chamber communicating with the fluid channels of the faucet, a valve sleeve fitting in said chamber and having openings to communicate with said fluid channels, a valve plug fitted in said valve sleeve and having a fluid channel extending therethrough, a valve controlling said channel, and removable means interlocking with the faucet body and overlying and preventing relative vertical movement of the sleeve or plug, said removable means and plug being formed to permit a relative vertical movement of the plug when the plug and sleeve are in a predetermined position relative to the fluid channels of the faucet.

2. A faucet body having a conical chamber communicating with the fluid channels of the faucet, a valve sleeve fitting in said chamber and having openings to communicate with said fluid channels, a valve plug fitted in said valve sleeve and having a fluid channel extending therethrough, a valve controlling said channel, a retaining ring cooperating with the faucet body and formed with lips to overlie the sleeve and plug to prevent relative vertical movement of these parts, said plug having openings to permit the passage of said lips when the plug is in a predetermined relative position to thereby permit relative vertical movement of the valve plug, and cooperating means on the sleeve and plug to compel a unit rotary movement of the sleeve and the plug.

3. A faucet body having a conical chamber communicating with the fluid channels of the faucet, a valve sleeve fitting in said chamber and having openings to communicate with said fluid channels, a valve plug fitted in said valve sleeve and having a fluid channel extending therethrough, a valve controlling said channel, a retaining ring cooperating with the faucet body and formed with lips to overlie the sleeve and plug to prevent relative vertical movement of these parts, said plug having openings to permit the passage of said lips when the plug is in a predetermined relative position to thereby permit relative vertical movement of the valve plug, and cooperating means on the sleeve and plug to compel a unit rotary movement of the sleeve and the plug, the lips on said ring being arranged in the path of rotary movement of said cooperating means on the sleeve to limit the rotary movement of the plug and sleeve relative to the body in both directions.

4. A faucet having a central conical chamber, fluid passages leading therefrom in both directions, a hollow valve sleeve snugly fitting in said chamber and formed with openings to register with the fluid passages, the upper edge of the sleeve being formed with upstanding lugs arranged in pairs, a valve plug having a fluid channel therethrough adapted to register with the openings in the valve sleeve, said plug snugly fitting in said sleeve and having a polyhedral projection extending above the upper edge of the sleeve, an operating disk fitting the plug projection and formed with radial lugs to rest between the lugs of the sleeve to operate the sleeve in the movement of the plug, and means removably interlocking with the wall of said faucet chamber to overlie and prevent vertical movement of the plug and sleeve relative to the faucet except in a predetermined position, the plug being formed with means to permit said plug to move independent of the holding means when the parts are in such predetermined position.

5. A faucet having a central conical chamber, fluid passages leading therefrom in both directions, a hollow valve sleeve snugly fitting in said chamber and formed with openings to register with the fluid passages, the upper edge of the sleeve being formed with upstanding lugs arranged in pairs, a valve plug having a fluid channel therethrough adapted to register with the openings in the valve sleeve, said plug snugly fitting in said sleeve and having a polyhedral projection extending above the upper edge of the sleeve, and a ring interlocking with said body and formed with lips to overlie the sleeve and plug to hold said parts against vertical movement relative to the body when the parts are in normal positions, said lips providing a means to limit the rotary movement of the sleeve and plug relative to the body to predetermined positions, the plug being formed with openings to permit the passage therethrough of the lips when the parts are in one of said predetermined positions, whereby the plug is permitted vertical movement relative to the sleeve and body.

In testimony whereof I affix my signature.

CHARLES W. WILSON.